United States Patent Office 3,353,025
Patented Nov. 14, 1967

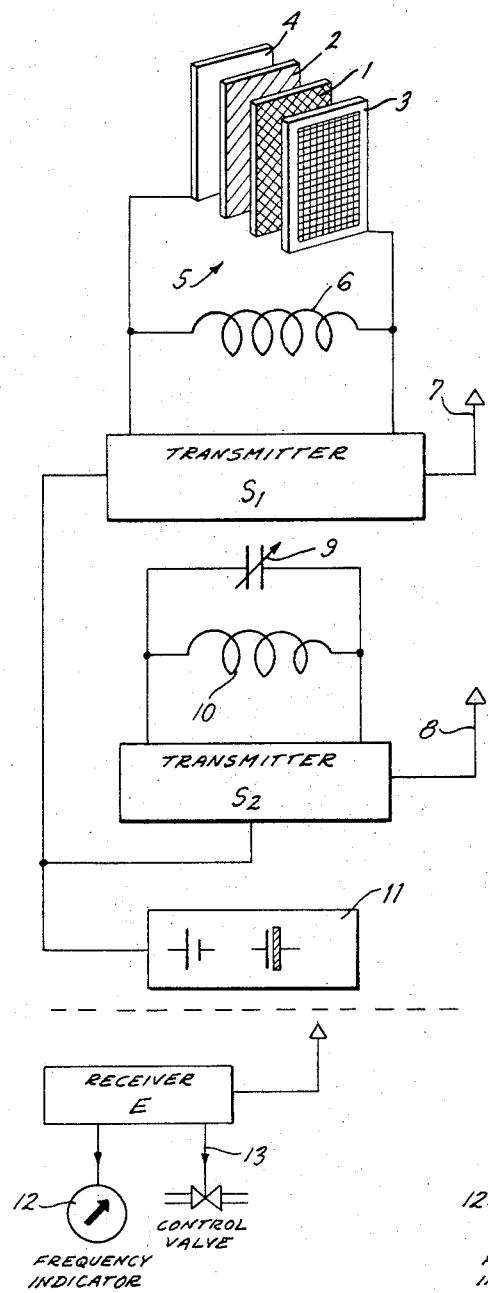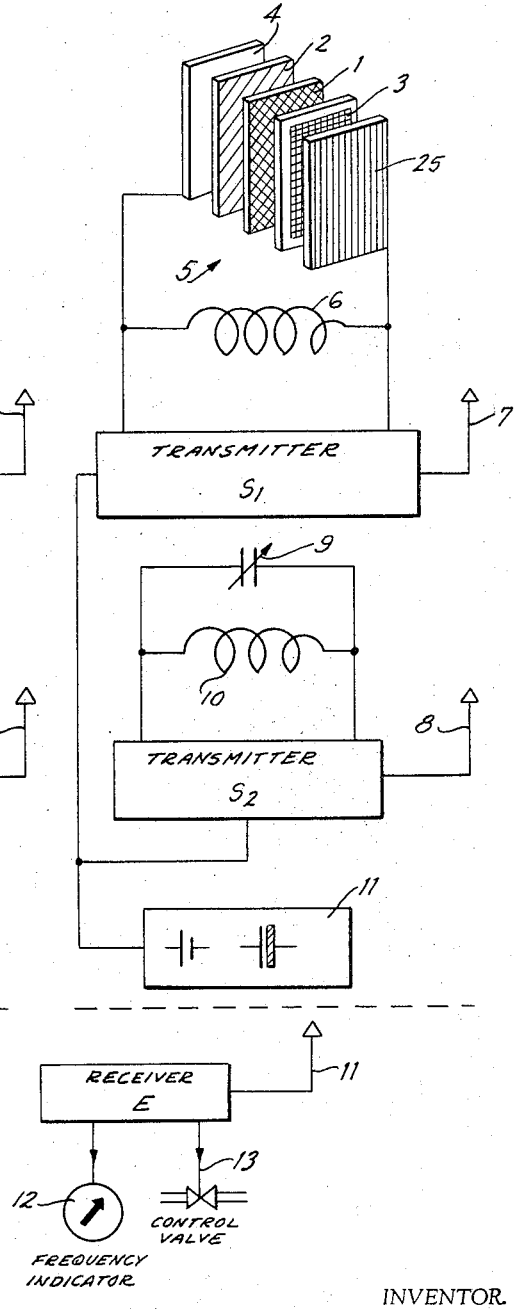

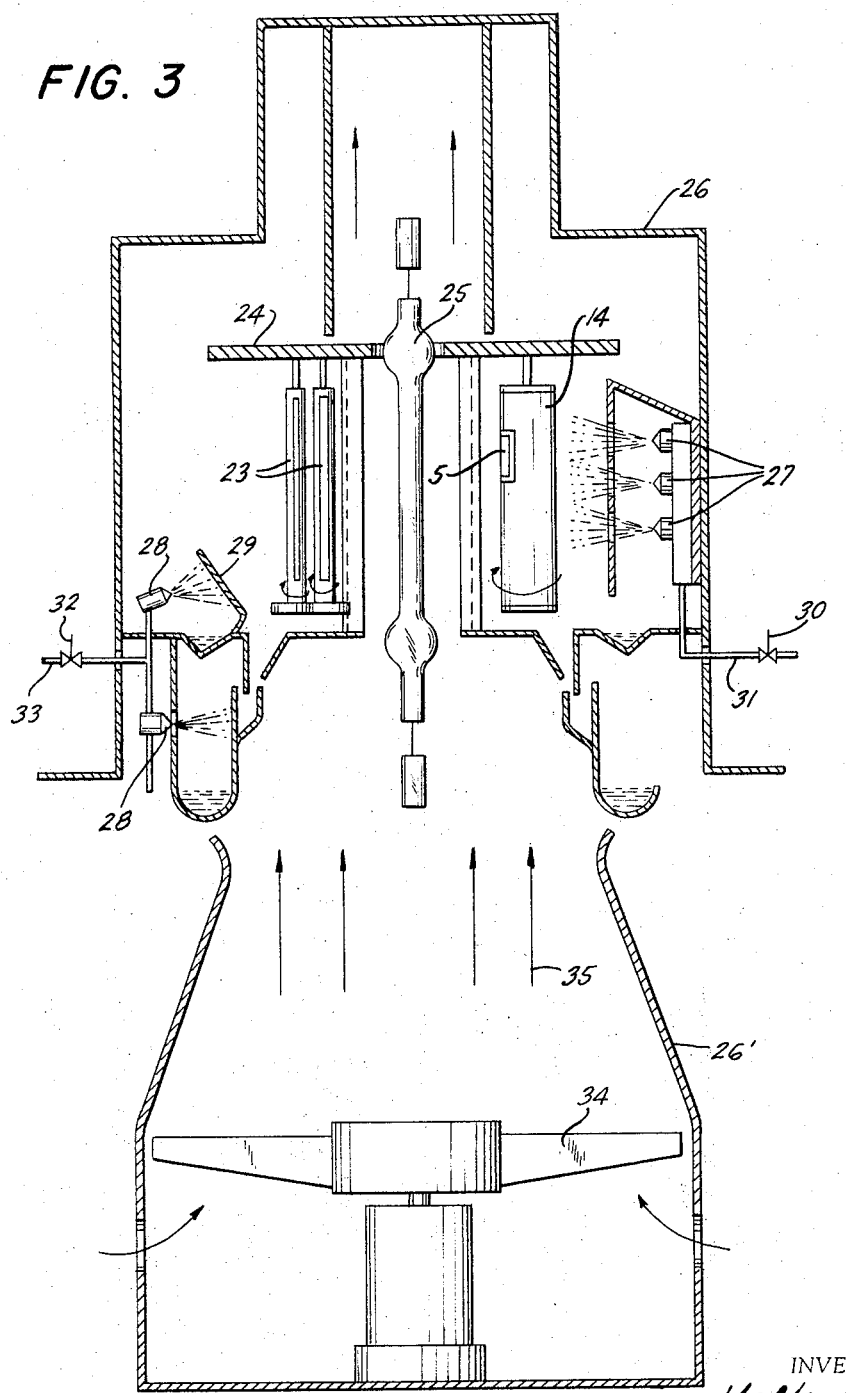

3,353,025
APPARATUS FOR TESTING A MATERIAL'S REACTION TO ILLUMINATION AND HUMIDITY WITH CAPACITOR-TYPE HUMIDITY DETECTOR
Walter Sturm, Hanau-Hohetanne, Germany, assignor to Quarzlampen Gesellschaft m.b.H., Hanau am Main, Germany
Filed Feb. 18, 1963, Ser. No. 259,041
Claims priority, application Germany, Feb. 22, 1962, Qu 697
14 Claims. (Cl. 250—215)

The present invention concerns an apparatus for testing the reaction of material specimens to irradiation and humidity, particularly the type which is used for testing the color fastness of textiles.

In most cases the material specimens are carried by specimen holders which are moved relative to a stationary source of irradiation, e.g. a source of light having predetermined spectral characteristics. Conventionally the specimens in the specimen holders are carried on a circular path around the source of irradiation, each specimen holder being rotated about its own axis after a certain amount of travel along said path. In this manner the specimens are alternatingly exposed to radiation and protected against it. In this manner rhythmical change of natural light between day and night is imitated. The influence of the weather is imitated by establishing different conditions of humidity in the test apparatus. Up to now the prevailing humidity conditions have been measured and indicated with the aid of a stationary hygrometer mounted at least partly within the space in which the specimens are being irradiated. Mostly hair hygrometers mounted on the inside of the housing wall of the apparatus have been used, but lithium chloride humidity indicators and other instruments together with thermometers have been used for indicating also the temperature at high and low humidity.

It has been found that the indications of such known equipment are not entirely satisfactory because the indications are not always the same even when the test conditions are the same, and because these indications did not constitute a reliable basis for comparing the characteristics of different colors or textile dyes in combination with certain textiles.

It has been discovered that these unsatisfactory characteristics of known equipment are mostly due to the particular manner in which up to now the humidity has been measured. The conventional method of measuring the humidity inside the apparatus cannot be relied upon because the humidity in the space inside the apparatus has only a remote relationship to the actually existing humidity in the specimen in itself, and in most cases differs therefrom. For instance, temperature variations in the space inside the apparatus do not have the same effect on the humidity in the space and on the humidity of the specimen. A change of the space humidity leads only after a substantial delay to a corresponding change of the specimen humidity. If various specimens of different type are compared with each other it is also to be taken into consideration that the capacity of the specimen material to absorb humidity or to give off humidity varies greatly between different materials. However, it is clear that for testing the reaction of a specimen to humidity it is necessary to know or to measure the humidity which is actually present in the specimen.

However, the desire to measure directly the humidity of a specimen in a test apparatus of the type described evidently brings up a problem which seems to be unsurmountable because all the other functions of the test apparatus, particularly the testing of the specimen material concerning its reaction to irradiation, must not be interfered with, and because the specimen holders carry out during the testing a rather complicated movement so that humidity indications furnished by an instrument mounted on the specimen holder could not be read by an observer outside the apparatus.

It is therefore one object of this invention to provide for a satisfactory system of measuring and indicating the specimen humidity in an apparatus of the type set forth. It is another object of this invention to provide for a humidity measuring system as mentioned above which furnishes signals to the outside apparatus indicative of the humidity existing in a specimen inside the apparatus and adapted to be used either for only indicating the existing humidity of the specimen or to control the humidity conditions inside the apparatus, or both.

It is a further object of this invention to provide for a humidity measuring system of the type set forth which is comparatively simple in its structure and entirely reliable under all operating conditions.

With above objects in view the invention includes in an apparatus for testing the reaction of material specimens to irradiation and humidity, in combination, a stationary source of irradiation; movable carrier means for moving at least one material specimen across the flux of radiation emanating from said source and including at least one specimen holder means adapted to hold said material specimen in at least one predetermined position relative to said source so as to cause irradiation thereof while it is moved, said specimen holder means including hygrometer means furnishing electrical signals representing the humidity of said specimen; stationary transducer means for converting said electrical signals into mechanical action; and transfer means for transferring said electrical signals from said hygrometer means on said specimen holder means during its movement to said stationary transducer means.

Preferably, the means for transferring the electrical signals from the hygrometer on the specimen holder during its movement to the stationary transducer comprises a wireless transmitter and receiver combination, the transmitter being located on the specimen holder and cooperating with a stationary receiver. In this manner all those difficulties are overcome which would arise if other transfer means were used, e.g. with electrical connections including sliding contacts moved together with the specimen carrier and cooperating with slip rings in the presence of considerable humidity, or with inductive energy transmission by means of induction coils of which one is stationary and the other one is moved together with the specimen holder.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

FIG. 1 is a diagrammatic illustration of one embodiment of the invention;

FIG. 1a is a modification of the embodiment shown by FIG. 1;

FIG. 3 is a diagrammatic sectional illustration of the characteristic components of a test apparatus incorporating the invention.

Figure 2:
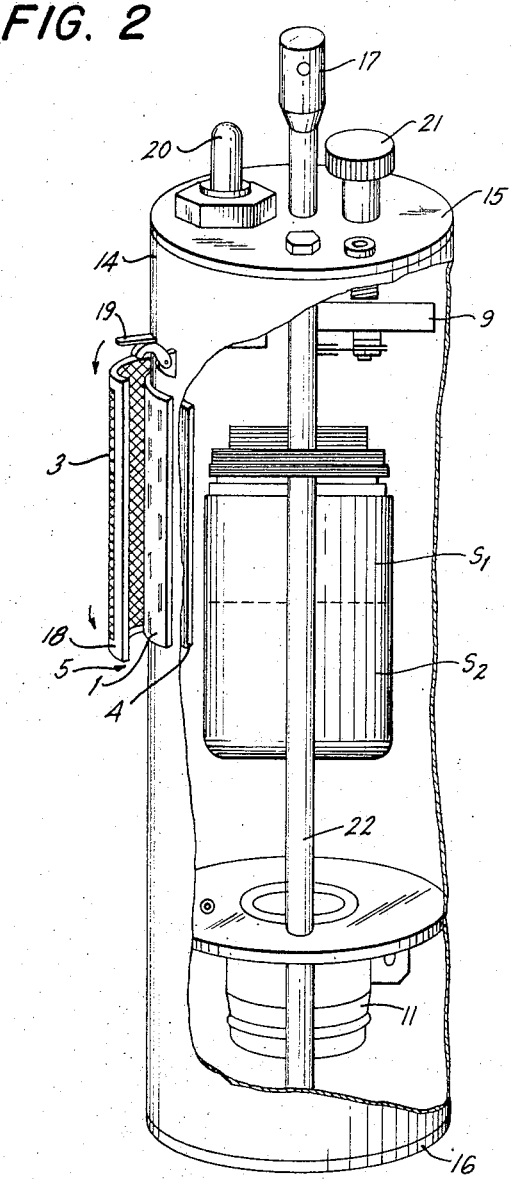
FIG. 2 is a partly broken, perspective illustration of a specimen holder arrangement according to the invention.

In order to obtain in the simplest possible manner electrical signals representing the humidity of the material specimen it is generally advisable and particularly useful in the present case if the sensitive portion of the hygrometer arrangement two capacitor plate members between which the specimen is held so as to constitute a dielectric. Any change in the humidity of the specimen entails a change of the capacitance of the capacitor arrangement. The capacitor arrangement may be used as the frequency determining element of an oscillator or tuning circuit of a transmitter so that the frequency of the signals transmitted thereby are indicative of the above mentioned capacitance and therefore indicative of the humidity of the specimen. The signals are then received by the receiver and utilized as mentioned above. The whole arrangement is of great simplicity and is reliable in operation.

Since the available space for arranging a transmitter in a specimen holder is restricted an electronic transmitter circuit, particularly a transistor circuit should be used. However, such transmitter circuits are highly sensitive to temperature changes. As a matter of fact, it is well possible that a given output signal of the transmitter is changed by a change of the temperature to a greater degree than it would be changed by a variation of the humidity of the specimen which it is supposed to represent. On the other hand, temperature changes are unavoidable in an apparatus for testing the reaction of material specimens to irradiation and humidity because for instance the source of irradiation may be the reason for a change in temperature and thus of the signals, particularly if the specimen holder containing the transmitter changes its position relative to the source of irradiation. In order to overcome the difficulties arising from temperature changes it is advisable to provide in the specimen holder two transmitters having substantially the same parameters, namely one transmitter the frequency of which is determined by the above mentioned capacitor arrangement containing the specimen, and a reference transmitter that may be tuned to a desired reference frequency. Both transmitters transmit their signals simultaneously so that the receiver will respond to a beat frequency defined as the difference between the two frequencies so that now this difference of frequencies, i.e. the beat frequency, is indicative of the humidity in the specimen. Evidently, this beat frequency is not influenced by temperature changes because a temperature change affects both transmitters in the same manner. In order to avoid undesirable effects of a very small difference between the two frequencies it is advisable to tune the reference transmitter to a frequency with is about one-half of the mean value of the frequency furnished by the main transmitter.

In order to simplify the entire arrangement it is suggested that also the source of electric energy operating the hygrometer arrangement including the transmitters is also carried by the moving specimen holder. In view of the fact that usually the test apparatus is equipped with a source of light it is of particular advantage to use as sources of energy photovoltaic cells which convert the available luminous energy into electrical energy. In order to avoid fluctuations of the signal frequencies the voltage output of the above mentioned source of energy which may also be an ordinary dry battery or a re-chargeable storage battery, should be stabilized. In the capacitor arrangement mentioned above one of the capacitor plate members may take the form of a frame having the second function of holding the specimen in place. It is, on the other hand, in order that one capacitor plate member is constructed as a wire mesh, with or without frame, whereby the specimen is not only held in place but also is fully accessible to irradiation and to humidity.

It is further suggested to modify the above described embodiment of the invention by adding to the plate members of the capacitor arrangement a substantially rigid, humidity-insensitive dielectric layer. This dielectric layer excludes the possibility of a short-circuit.

This last-mentioned feature can be incorporated in the test apparatus most easily if the dielectric layer is a portion of a housing of the specimen holder which surrounds also the transmitter or transmitters and other pertaining circuit elements. This housing of the specimen holder should be as small as possible so that the entire specimen holder according to the invention can be accommodated in the test apparatus in the same manner and with the same space requirements as other normal or conventional specimen holders. A saving on space is also achieved by utilizing support bars holding the transmitter or transmitters and other circuit components in the specimen holder housing as transmitter antennas.

As will be seen further below the invention makes it possible to carry out a test program the results of which will be always the same as long as the prevailing conditions are the same. The signals representing the humidity of the specimen and received by the receiver may be used not only for actuating an indicator device but also for controlling the introduction of humidity into the test space inside the apparatus. In this manner the supply of moistening liquid can be so regulated that various specimens to be compared with each other will have the same humidity. On the other hand, if desired, alternating periods of predetermined high humidity and of very low humidity can be provided for in accordance with a predetermined program.

Referring now to FIGS. 1 and 1a the components of the capacitor arrangement 5 are shown in an exploded view. The specimen 1 which may be a piece of fabric the humidity of which is to be measured is placed between the capacitor plate member 3 consisting of a frame and a wire mesh, and a dielectric layer or plate 2 which is placed in front of the second capacitor plate member 4.

The arrangement in FIG. 1a is the same except that in this case the capacitor arrangement 5 is provided additionally with an ion filter 25 of conventional type on that side from which humidity has access through the member 3 to the specimen 1. The ion filter 25 eliminates disturbing effects of impurities or contaminations which otherwise might reach the specimen. Under these circumstances, however, the humidity measurement remains free of such disturbing factors.

In FIGS. 1 and 1a the capacitor arrangement 5 together with an inductance coil 6 constitutes an oscillator or tuning circuit which is connected with a conventional electronic transmitter $S_1$ so as to tune the latter to the resonance frequency of the tuning circuit. A signal at this frequency is then emitted from the antenna 7 and varies of course as the capacitance of the capacitor arrangement 5 varies due to changes in humidity of the specimen 1.

For the reasons set forth further above a second transmitter $S_2$ of the same type and having the same parameters as the transmitter $S_1$ is provided as a reference transmitter. This transmitter is tunable e.g. by a tuning circuit composed of the variable capacitor 9 and the inductance coil 10 to any desired frequency so as to emit a corresponding signal through its antenna 8. Both transmitters $S_1$ and $S_2$ are supplied with electrical energy from a battery 11 which may be composed of conventional photovoltaic cells.

The above described components are all mounted on the movable carrier means of the apparatus, or more specifically in connection with the specimen holder device thereof. However, the receiver, indicator and/or control arrangement is mounted stationarily. The receiver arrangement comprises a conventional receiver with an antenna 11 for receving the signals emanating from the transmitters $S_1$ and $S_2$. The receiver E comprises transducer means for converting the received electrical signals into mechanical action, e.g. a frequency indicator 12 which moves on indicator pointer between positions corresponding to different received signal frequencies and therefore corresponding to the humidity of the specimen 1. The transducer means may also be of the nature of an electrical control of a valve 13 which controls the introduction of moistening liquid into the apparatus as will be described further below. Of course, if desired, both devices 12 and 13 may be provided simultaneously.

FIG. 2 illustrates by way of example a preferred form of a specimen holder according to the invention and incorporating the above-mentioned features. The specimen holder comprises a tubular housing 14 tightly closed at both ends by plates 15 and 16. The tubular member 14 is made of synthetic material which, at least in the area of the capacitor arrangement 5 described below should constitute a dielectric. The entire housing may be suspended from a support member, not shown, by means of the central suspension rod 17. If the above-mentioned not illustrated support member is rotated the entire housing of the specimen holder is likewise rotated. In the capacitor arrangement 5 a metal layer 4 applied to the inside of the housing wall 14 constitutes one of the capacitor plate members. The adjacent portion of the housing wall 14 constitutes the above mentioned dielectric layer. The specimen 1 is placed on the outside surface of the tubular member 14 and may be held there in position by the tiltable outer capacitor plate member 3 which consists in this example of a framed wire mesh and is shown in a position partly tilted away from the housing wall 14. Before starting the test the member 3 may be tilted in the direction of the arrows toward the housing wall 14 so as to cover substantially the specimen 1. In this position the member 3 may be clamped or locked by engagement with a tiltable latch or hook 19 which in tilted down position engages the frame 18 of the member 3.

Inside the housing 14-16 a support rod 22 is mounted parallel with but spaced with the central axis of the housing member 14 and may be composed of two rod portions insulated from each other. The rod 22 carries the two transmitters $S_1$ and $S_2$ and the source of electric energy 11. If the latter consists of photovoltaic cells then the housing wall 14 or at least a portion thereof should be transparent. The two portions of the rod 22 serve as antennas for the transmitters $S_1$ and $S_2$, respectively. Mounted on the top plate 15 is the tuning capacitor 9 whose control knob 21 is accessible from the outside of the plate 15. This plates also carries a main switch 20. For the sake of clarity of the illustration FIG. 2 does not contain any illustration of the electric connections between the various components which does not seem to be necessary since these connections are clearly indicated in FIGS. 1 and 1a.

FIG. 3 illustrates diagrammatically how the arrangement according to the invention is suitably incorporated in an entire test apparatus. The test apparatus comprises a housing with an upper portion 26 and a lower portion 26' so that the inner space of the housing in the upper portion of which the tests are carried out is separated from the surrounding atmosphere. In the center of the housing in axial direction thereof a source of irradiation e.g. a mercury vapor lamp 25 is arranged stationarily. A turntable 24 is mounted by means not shown for rotation about the vertical axis of the apparatus. From this turntable 24 a plurality of ordinary specimen holders 23 are suspended and are operated in such a manner that during the rotation of the turntable 24 each individual specimen holder 23 is also rotated about its axis. The specimen holder 14 according to the invention is similarly suspended from the turntable 24 and is actuated in the some manner so that it travels in the same manner as the specimen holders 23 and at a constant speed along a circular path around the lamp 25. Exactly as in the specimen holder 23 each specimen is alternatingly exposed to radiation from the lamp 25 and protected against it, also the specimen 1 held in the capacitor arrangement 5 of the specimen holder 14 is alternatingly exposed to the radiation and oriented in a direction away from the lamp 25.

A plurality or spray nozzles 27 and 28 are provided for injecting a suitable fluid and for maintaining in the interior of the housing portion 26 a predetermined humidity. The nozzles 27 are so arranged as to spray liquid directly on the specimens 1 carried by the specimen holder 14. However, the nozzles 28 spray the liquid against baffle plates 29 so as to humidify only the air in the housing portion 26. The amount of liquid introduced through the nozzles may be regulated by means of a regulator valve 30 in the feed line 31 and valve 32 in the feed line 33, respectively. Either one or both regulator valves may be actuated electrically by the output of the receiver E not shown in FIG. 3 so that in this case the electrically controlled valve would correspond to the element 13 of FIGS. 1 and 1a.

A fan 34 in the bottom portion 26' of the apparatus housing furnishes air for cooling the lamp 25. At the same time also the air in the actual test space of the housing portion 26 is renewed from time to time by the air stream 35 created by the fan 34.

In normal operation several specimens of material which is to be tested concerning its reaction to irradiation and humidity are placed in the specimen holders 23 and an additional specimen 1 is placed into the capacitor arrangement 5. During the following test operation the specimen 1 will be subjected to the same conditions of irradiation (intensity and duration), humidity, etc. as the other specimens in the specimen holders 23. However the humidity of the specimen 1 in the capacitor arrangement 5 can be measured and indicated by the above described arrangement according to the invention.

It is evident that the main transmitter $S_1$ can be adjusted in a conventional manner so that it furnishes a predetermined frequency $F_1$ when a selected degree of humidity is present in the specimen 1. Consequently, a variation of the frequency $F_1$ in one or the other direction is an indication of a corresponding variation of the specimen humidity or rather a deviation of that humidity from said selected value. In order to eliminate the effect of temperature variations on the frequency output of the transmitter, the second or reference transmitter $S_2$ which is exposed to the same temperatures as the main transmitter $S_1$ furnishes a frequency which should be preferably one-half of the frequency $F_1$. The receiver E receives both frequencies simultaneously with the result that it responds to a beat frequency which will vary with any variation of the frequency $F_1$ and therefore is indicative of variations of the humidity in the specimen or of deviations of said humidity from its selected value. By means of the variable capacitor 9 the entire arrangement can be set for a different desired humidity value, or the capacitor 9 may be used for adjusting the arrangement with respect to the setting of the capacitor arrangement 5 whenever this may be desirable e.g. if a specimen of different material e.g. of greater thickness is introduced into that capacitor arrangement.

As has been indicated above the output signal of the receiver E may be used for furnishing on the indicator 12 and indication of the humidity in the specimen. On the other hand the output signal of the receiver E may also be used for directly regulating the introduction of humidity through operation of the nozzles 27 or 28. Consequently the humidity within the test chamber can be maintained constant at predetermined values so that in this manner a test apparatus of great reliability and accuracy is obtained.

The above described embodiments of the invention may be modified in various ways without departing from the basic idea of this invention. There are certain cases where satisfactory indications and results can be obtained if only the main transmitter and no reference transmitter is used. Also, if various specimens of different materials are to be tested one after the other, but if the capacities of these different materials of absorbing and giving off humidity do not differ materially from each other, then it may be permissible to leave one specimen 1 of substantially that capacity in the capacitor arrangement 5 while the different material specimens held in the specimen holders 23 are consecutively exchanged against each other.

It will be understood that each of the elements described above or two or more together, may also find a useful application in other types of an apparatus for testing the reaction of material specimens to irradiation and humidity differing from the types described above.

While the invention has been illustrated and described as embodied in an apparatus for testing the reaction of material specimens to irradiation and humidity with hygrometer means furnishing electrical signals and receiver means for receiving these signals, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In an apparatus for testing the reaction of material specimens to irradiation and humidity, in combination, a stationary source of irradiation; movable carrier means for moving at least one material specimen across the flux of radiation emanating from said source and including at least one specimen holder means adapted to hold said material specimen in at least one predetermined position with one side thereof facing said source so as to cause irradiation thereof while it is moved, said specimen holder means including hygrometer means including two capacitor plate members arranged on opposite sides of said specimen with one of said capacitor plate members located in front of said one side of said specimen and being irradiation permeable so as to let said irradiation pass therethrough to impinge on said specimen, said material specimen placed as a dielectric between said plate members constituting a capacitance of variable magnitude depending on the humidity of said specimen, said hygrometer means furnishing electrical signals having a characteristic varying with the variation of said capacitance and including transmitter means for wireless transmission of said signals; and stationary receiver means for receiving said signals and including transducer means for converting said electrical signals into mechanical action.

2. In an apparatus as claimed in claim 1, wherein said transmitter means includes tuning circuit means, said variable capacitance being connected as a signal frequency determining element in said tuning circuit means so that variations of the signal frequency are indications of the varying humidity of the specimen.

3. An apparatus as claimed in claim 2, wherein said specimen holder means include additionally reference transmitter means tunable to a desired reference frequency different from the range of said variable signal frequency depending upon said variable capacitance, and transmitting reference signals at said reference frequency, said receiver means receiving both said signals at said variable frequency and at said reference frequency, respectively, and said transducer means responding to the variable beat frequency based on said two frequencies, the parameters of said first mentioned transmitter means and of said reference transmitter means being so chosen that frequency variations due to changes of temperature remain without substantial influence on said beat frequency.

4. An apparatus as claimed in claim 3, wherein said reference transmitter means is tuned to a reference frequency amounting to substantially one-half of the mean value of said range of said variable signal frequency transmitted by said first mentioned transmitter means.

5. In an apparatus as claimed in claim 1 and including photovoltaic cell means exposed to said radiation and furnishing accordingly electric energy to said transmitter means.

6. An apparatus as claimed in claim 3, including photovoltaic cell means exposed to said radiation and furnishing accordingly electric energy to both said transmitter means.

7. An apparatus as claimed in claim 1, wherein that one of said plate members which faces said source of irradiation when said specimen is exposed thereto is constructed as a grid.

8. An apparatus as claimed in claim 1, including a layer of substantially rigid humidity-insensitive dielectric material arranged between said capacitor plate members.

9. An apparatus as claimed in claim 7, including a layer of substantially rigid humidity-insensitive dielectric material arranged between said capacitor plate members.

10. An apparatus as claimed in claim 1, wherein said specimen holder means comprises a housing surrounding said transmitter means, at least a wall portion of said housing being made of dielectric material, one of said capacitor plate members being arranged on the inside of said wall portion, the other capacitor plate member being arranged on the outside of said wall portion.

11. An apparatus as claimed in claim 3, wherein said specimen holder means comprises a housing surrounding both said transmitter means, at least a wall portion of said housing being made of dielectric material, one of said capacitor plate members being arranged on the inside of said wall portion, the other capacitor plate member being arranged on the outside of said wall portion.

12. An apparatus as claimed in claim 1, wherein ion filtering means are arranged in front of and adjacent to that one of said capacitor plate members which is locate on the side of said specimen which is exposed to radiation and humidity.

13. An apparatus as claimed in claim 1, wherein said specimen holder means comprises a housing surrounding said transmitter means, the latter being supported in said housing by a support bar connected with said transmitter means as its antenna.

14. An apparatus as claimed in claim 3, wherein said specimen holder means comprises a housing surrounding both said transmitter means, the latter being supported in said housing by a support bar having portions each connected with a different one of said transmitter means as its antenna, respectively.

References Cited

UNITED STATES PATENTS

| | | | |
|---|---|---|---|
| 1,881,310 | 10/1932 | Coatsworth | 250—52 |
| 2,058,826 | 10/1936 | Reece | 250—52 |
| 2,468,691 | 4/1949 | Smith | 236—44 |
| 3,046,479 | 7/1962 | Mead et al. | 324—61 |
| 3,090,004 | 5/1963 | Breen et al. | 324—61 |
| 3,168,829 | 2/1965 | Nelson | 236—44 |
| 3,224,266 | 12/1965 | Klippert | 73—150 |

WALTER STOLWEIN, *Primary Examiner.*

RALPH G. NILSON, *Examiner.*

E. STRICKLAND, M. ABRAMSON,
*Assistant Examiners.*